United States Patent
Zhou et al.

(10) Patent No.: US 8,970,982 B1
(45) Date of Patent: Mar. 3, 2015

(54) DISK DRIVE COMPENSATING FOR NON-LINEARITY OF A HEAD BASED ON A FLY HEIGHT OF THE HEAD

(71) Applicant: Western Digital Technologies, Inc., Irvine, CA (US)

(72) Inventors: Jianguo Zhou, Foothill Ranch, CA (US); Abhishek Dhanda, San Jose, CA (US); Eugene C. Wu, Irvine, CA (US); Teddy T. Chen, Laguna Woods, CA (US); Sanghoon Chu, San Jose, CA (US); Guoxiao Guo, Irvine, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/100,646

(22) Filed: Dec. 9, 2013

Related U.S. Application Data

(60) Provisional application No. 61/909,264, filed on Nov. 26, 2013.

(51) Int. Cl.
*G11B 21/02* (2006.01)
*G11B 21/12* (2006.01)

(52) U.S. Cl.
CPC ...................................... *G11B 21/12* (2013.01)
USPC ............... 360/75; 360/77.05; 360/69; 360/70

(58) Field of Classification Search
None
See application file for complete search history.

(56) References Cited

U.S. PATENT DOCUMENTS

| | | | |
|---|---|---|---|
| 5,940,240 A | 8/1999 | Kupferman | |
| 5,946,158 A | 8/1999 | Nazarian et al. | |
| 5,982,173 A | 11/1999 | Hagen | |
| 6,130,798 A | 10/2000 | Chang et al. | |
| 6,369,971 B1 | 4/2002 | Everett | |
| 6,369,974 B1 | 4/2002 | Asgari et al. | |
| 6,421,198 B1 | 7/2002 | Lamberts et al. | |
| 6,429,995 B1 | 8/2002 | Dobbek et al. | |
| 6,760,184 B1 | 7/2004 | Cunningham | |
| 6,762,902 B2 | 7/2004 | Chew | |
| 6,768,606 B2 | 7/2004 | Helms | |
| 6,768,609 B2 | 7/2004 | Heydt et al. | |
| 6,798,606 B2 | 9/2004 | Tang et al. | |
| 7,724,461 B1 | 5/2010 | McFadyen et al. | |
| 8,077,428 B1 | 12/2011 | Chen et al. | |
| 2007/0268615 A1* | 11/2007 | McFadyen et al. | 360/75 |
| 2008/0239556 A1 | 10/2008 | Wiseman et al. | |
| 2010/0033860 A1 | 2/2010 | Tomita | |

* cited by examiner

*Primary Examiner* — Muhammad N Edun

(57) ABSTRACT

A disk drive is disclosed comprising a disk comprising a plurality of servo tracks, wherein each servo track comprises a plurality of servo sectors. A position of the head is measured based on the servo sectors, and a compensated position of the head is generated based on the measured position of the head and a fly height of the head. The head is actuated over the disk based on the compensated position of the head.

16 Claims, 5 Drawing Sheets

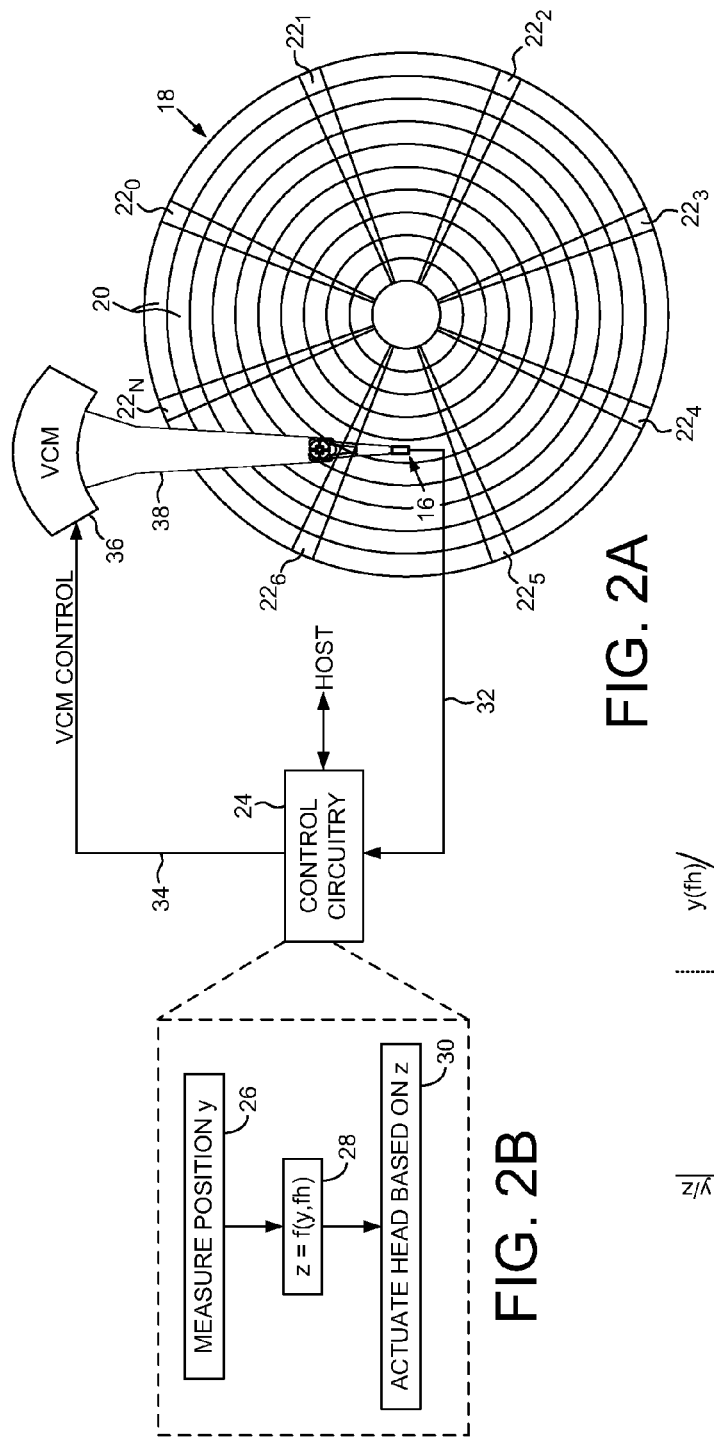

DISK DRIVE COMPENSATING FOR NON-LINEARITY OF A HEAD BASED ON A FLY HEIGHT OF THE HEAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Disk drives may employ a head having a suitable write element, such as an inductive coil, and a suitable read element, such as a magnetoresistive (MR) element. The read element may exhibit a non-linear response which may result in a non-linear PES measurement. That is, the measured PES relative to the actual head displacement from the centerline of the target servo track may exhibit a non-linear relationship. The prior art has compensated for this non-linearity by adjusting the measured PES based on a function that linearizes the PES. For example, U.S. Pat. No. 5,946,158 entitled "SELF-PES LINEARITY CALIBRATION METHOD FOR MR HEAD" teaches to adjust the PES based on:

$$z(y)=y+c(y)$$

where y represents the measured PES and c(y) represents a correction value that is computed based on a linearizing function.

BRIEF DESCRIPTION OF THE DRAWINGS

FIG. 2A shows a disk drive according to an embodiment comprising a head actuated over a disk, wherein the head comprises a read element that exhibits a non-linear response.

FIG. 2B is a flow diagram according to an embodiment, wherein a compensated position of the head is generated based on a measured position of the head and a fly height of the head.

FIG. 2C illustrates a non-linear response of the head that may result in a non-linear relationship between an actual position x of the head, and a measured position y at a particular fly height.

DETAILED DESCRIPTION

Figure 1:
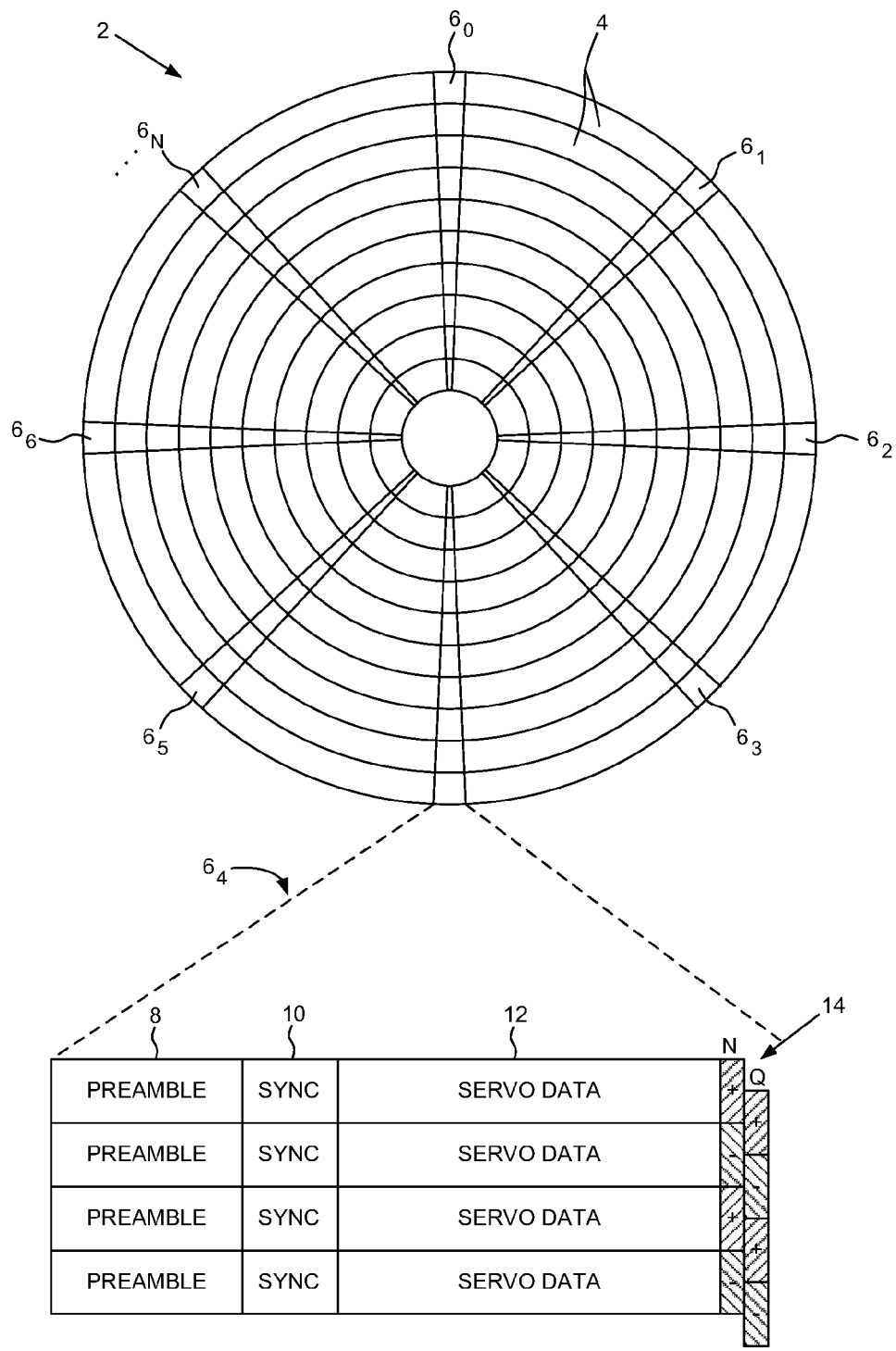
FIG. 1 shows a prior art disk format comprising a plurality of servo tracks defined by servo sectors.

FIG. 2A shows a disk drive according to an embodiment comprising a head 16 actuated over a disk 18 comprising a plurality of servo tracks 20, wherein each servo track comprises a plurality of servo sectors $22_0$-$22_N$. The disk drive further comprises control circuitry 24 configured to execute the flow diagram of FIG. 2B, wherein a position of the head is measured based on the servo sectors (block 26), a compensated position of the head is generated based on the measured position of the head and a fly height of the head (block 28), and the head is actuated over the disk based on the compensated position of the head (block 30).

In the embodiment of FIG. 2A, the control circuitry 24 processes a read signal 32 emanating from the head 16 to demodulate the servo sectors $22_0$-$22_N$ and generate a position error signal (PES) representing an error between the actual position of the head and a target position relative to a target track. The control circuitry 24 filters the PES using a suitable compensation filter to generate a control signal 34 applied to a voice coil motor (VCM) 36 which rotates an actuator arm 38 about a pivot in order to actuate the head 16 radially over the disk 18 in a direction that reduces the PES. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the head 16 may comprise a non-linear read element (e.g., a magnetoresistive (MR) element) that exhibits a non-linear response to the polarity of magnetic transitions recorded on the disk 18. In addition, the non-linearity of the read element may vary with the fly height of the head 16. The non-linear response of the read element may result in a non-linear relationship between the actual position x of the head, and the measured position y, an example of which is shown in FIG. 2C for a particular fly height. As the fly height of the head changes, there is a corresponding change in the non-linear relationship. The non-linearity of the read element induces an error in the PES which degrades the serving accuracy of the control circuitry 24. Accordingly, in one embodiment a compensated position of the head is generated based on the measured position of the head and a fly height of the head to generate an adjusted position z having a more linear relationship with the actual position x of the head as shown in FIG. 2C.

Figure 3A:
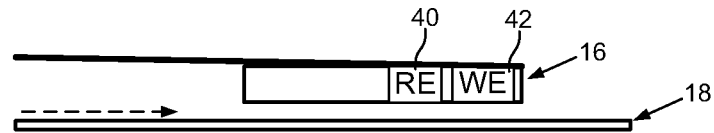
FIG. 3A shows an embodiment of the head comprising a read element and a write element.
Figure 4A:
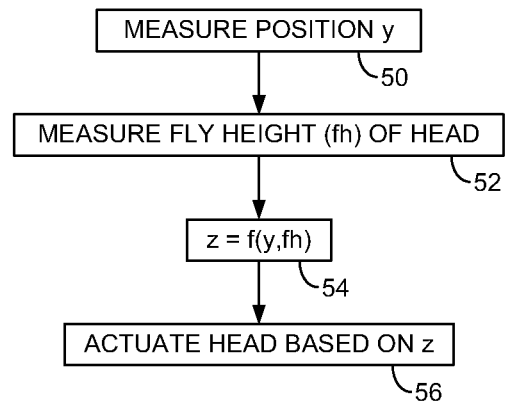
FIG. 4A is a flow diagram according to an embodiment, wherein a compensated position of the head is generated based on a measured position of the head and a measured fly height of the head.

FIG. 3A shows an embodiment of the head 16 comprises a suitable read element 40 (e.g., an MR element) and a suitable write element 42 (e.g., an inductive coil). In one embodiment, the fly height of the head is measured by processing the read signal emanating from the read element 40 while reading any suitable data from the disk 18. For example, in one embodiment a periodic pattern may be read from the disk 18 and the fly height measured based on a ratio of harmonics in the read signal. In one embodiment, the periodic pattern may be recorded in a calibration track and read periodically in order to measure the fly height of the head. In another embodiment, the periodic pattern may be recorded in a data sector or a servo sector and read during normal access operations in order to measure the fly height of the head. For example, the periodic pattern may be recorded in the preamble of a data/servo sector, and/or the periodic pattern may be recorded in a servo burst of a servo sector or in a dedicated field of a data/servo sector. Referring to the flow diagram of FIG. 4A, in one embodiment a servo sector is read and a corresponding PES measured (block 50), a fly height of the head is measured (block 52), the PES is adjusted using a correction value generated based on the measured PES and the measured fly height (block 54), and the head is actuated over the disk based on the adjusted PES (block 56).

Figure 3B:
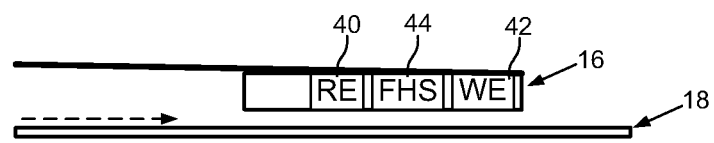
FIG. 3B shows an embodiment of the head comprising a fly height sensor.

FIG. 3B shows an embodiment of the head 16 comprising a suitable fly height sensor (FHS) 44, such as a suitable MR element, capacitive element, tunneling sensor, or any suitable semiconductor element capable of generating a fly height signal based on the proximity of the head 16 to the disk 18. When a servo sector is read and a corresponding PES measured, in one embodiment the PES is adjusted using a correction value generated based on the measured PES and the fly height signal generated by the FHS 44.

Figure 3C:
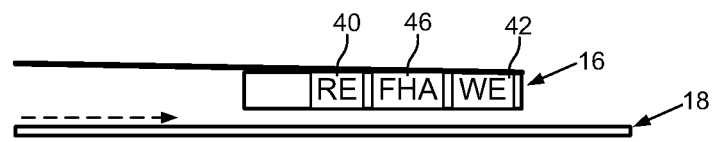
FIG. 3C shows an embodiment of the head comprising a fly height actuator.
Figure 4B:
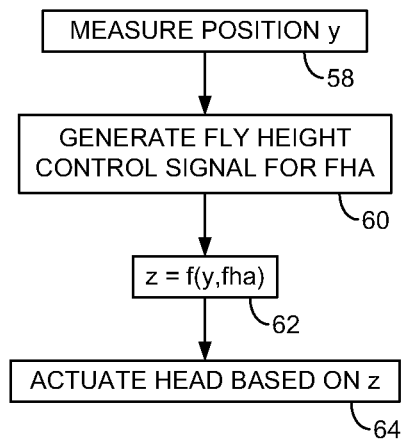
FIG. 4B is a flow diagram according to an embodiment, wherein a compensated position of the head is generated based on a measured position of the head and a fly height control signal applied to a fly height actuator.

FIG. 3C shows an embodiment of the head 16 comprising a suitable fly height actuator (FHA) 46 operable to actuate the head 16 vertically over the disk 18 in order to control the fly height of the head. Any suitable FHA 46 may be employed, such as a thermal element that actuates through thermal expansion, or a piezoelectric (PZT) element that actuates through mechanical deflection. In one embodiment, the fly height control signal applied to the FHA may represent the fly height of the head 16 used to generate the compensated position of the head. That is when a servo sector is read and a corresponding PES measured, in one embodiment the PES is adjusted using a correction value generated based on the measured PES and the fly height control signal applied to the FHA 46. As the fly height control signal changes, for example, to compensate for changes in an environmental condition (e.g., temperature) or a change in operating mode, there is a corresponding adjustment to the correction values used to adjust the PES and thereby compensate for the non-linearity of the read element 40. Referring to the flow diagram of FIG. 4B, in one embodiment a servo sector is read and a corresponding PES measured (block 58), a fly height control signal for an FHA is generated (block 60), the PES is adjusted using a correction value generated based on the measured PES and the fly height control signal (block 62), and the head is actuated over the disk based on the adjusted PES (block 64).

Figure 3D:
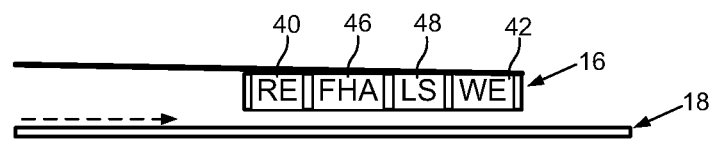
FIG. 3D shows an embodiment wherein the fly height actuator of the head comprises a laser for heating the disk while writing data to the disk.

FIG. 3D shows an embodiment of the head 16 comprising a suitable laser 48 (e.g., a laser diode) for heating the disk 18 while writing data to the disk 18 in a technique referred to as heat assisted magnetic recording (HAMR). In one embodiment, the thermal response of the laser 48 causes the read element 40 to protrude toward the disk 18, and therefore the laser 48 may be considered as a type of fly height actuator. Accordingly, in one embodiment when a servo sector is read and a corresponding PES measured, the PES may be adjusted using a correction value generated based on the measured PES and the control signal applied to the laser 48. For example, a preheat power may be applied to the laser 48 during non-write operations, such as when the head 16 is reading a servo sector. Since the pre-heat power of the laser 48 may affect the fly height of the read element 40, in one embodiment the fly height of the head may be determined based on the control signal applied to the laser 48 when reading a servo sector in order to generate the compensated position for the head 16.

Figures 5A, 5B:
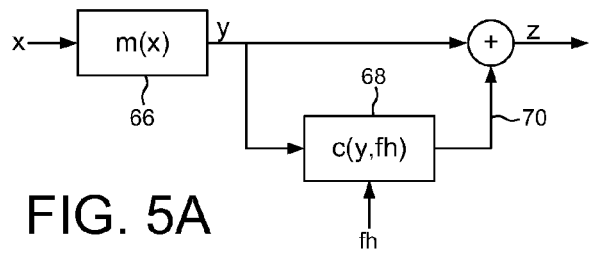
FIG. 5A shows an embodiment wherein the compensated position of the head is generated by adding a correction value to the measured position of the head.
FIG. 5B shows an embodiment wherein a compensation table of correction values is generated for each of a plurality of corresponding fly heights of the head.

FIG. 5A shows control circuitry according to an embodiment wherein a measured position y of the head is generated by block 66, such as by demodulating the read signal representing the servo bursts of a servo sector. Block 68 generates correction values 70 based on the measured position y and the fly height of the head fh, and the measured position y is adjusted by the corresponding correction value 70 to generate an adjusted position z that is better linearized. The block 68 for generating the correction values 70 may be implemented in any suitable manner, such as with a linearizing function or with a table that represents the output of the linearizing function.

The linearizing function for generating the correction values that linearize the measured position y of the head may be generated in any suitable manner. In one embodiment, the transfer function between the actual position x of the head and the measured position y may be represented as a variable gain relative to the displacement of the head from a centerline of a target track. In one embodiment, the head is displaced from the centerline until the measured position y reaches a predetermined value. The corresponding gain is then measured using any suitable technique, such as by injecting a sinusoid into the servo system and measuring the resulting response by computing a discrete Fourier transform. This process may be repeated for different values of the measured position y in order to generate a corresponding array of gains. The array of gains may then be evaluated to generate the linearizing function, for example, by computing coefficients of a Fourier series. In one embodiment, the above procedure may be repeated for a number of different fly heights for the head in order to generate a number of corresponding linearizing functions.

In one embodiment shown in FIG. 5B, the linearizing function is first generated for a plurality of different fly heights for the head (e.g., by adjusting a fly height control signal applied to an FHA), and then a plurality of tables are generated based on the linearizing functions over a range of values for the measured position y. During normal operation, the table corresponding to the current fly height for the head is indexed by the measured position y, and the corresponding correction value used to adjust the measured position y to generate the compensated position for the head.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
    a disk comprising a plurality of servo tracks, wherein each servo track comprises a plurality of servo sectors;
    a head; and
    control circuitry configured to:
        measure a radial position of the head based on the servo sectors;
        generate a compensated radial position of the head based on the measured radial position of the head and a fly height of the head; and
        actuate the head radially over the disk based on the compensated radial position of the head.

2. The disk drive as recited in claim 1, wherein the control circuitry is further configured to:
    measure the fly height of the head; and
    generate the compensated radial position of the head based on the measured radial position of the head and the measured fly height.

3. The disk drive as recited in claim 2, wherein the fly height actuator controls the fly height of the head through thermal expansion.

4. The disk drive as recited in claim 3, wherein the fly height actuator comprises a laser for heating the disk when writing data to the disk.

5. The disk drive as recited in claim 1, wherein the head comprises a fly height actuator and the control circuitry is further configured to:
    generate a fly height control signal applied to the fly height actuator in order to control the fly height of the head; and
    generate the compensated radial position of the head based on the measured radial position of the head and the fly height control signal.

6. The disk drive as recited in claim 1, wherein the control circuitry is further operable to:
    calibrate a plurality of compensation tables, where each table corresponds to a different fly height of the head; and
    generate the compensated radial position of the head based on the measured radial position of the head and the compensation table corresponding to a current fly height of the head.

7. The disk drive as recited in claim 6, wherein the control circuitry is further operable to generate the compensated radial position of the head by interpolating between compensation values stored in at least two of the compensation tables corresponding to a current fly height of the head.

8. The disk drive as recited in claim 1, wherein the control circuitry is further operable to:
    calibrate a compensation function based on compensation values generated over a plurality of fly heights of the head; and
    generate the compensated radial position of the head based on the measured radial position of the head and a current fly height of the head input into the compensation function.

9. A method of operating a disk drive, the method comprising:
    measuring a radial position of a head based on servo sectors on a disk;
    generating a compensated radial position of the head based on the measured radial position of the head and a fly height of the head; and
    actuating the head radially over the disk based on the compensated radial position of the head.

10. The method as recited in claim 9, further comprising:
    measuring the fly height of the head; and
    generating the compensated radial position of the head based on the measured radial position of the head and the measured fly height.

11. The method as recited in claim 10, wherein the fly height actuator controls the fly height of the head through thermal expansion.

12. The method as recited in claim 11, wherein the fly height actuator comprises a laser for heating the disk when writing data to the disk.

13. The method as recited in claim 9, further comprising:
    generating a fly height control signal applied to a fly height actuator in order to control the fly height of the head; and generating the compensated radial position of the head based on the measured radial position of the head and the fly height control signal.

14. The method as recited in claim 9, further comprising:

calibrating a plurality of compensation tables, where each table corresponds to a different fly height of the head; and generating the compensated radial position of the head based on the measured radial of the head and the compensation table corresponding to a current fly height of the head.

15. The method as recited in claim 14, further comprising generating the compensated radial position of the head by interpolating between compensation values stored in at least two of the compensation tables corresponding to a current fly height of the head.

16. The method as recited in claim 9, further comprising:

calibrating a compensation function based on compensation values generated over a plurality of fly heights of the head; and generating the compensated radial position of the head based on the measured radial position of the head and a current fly height of the head input into the compensation function.

* * * * *